(12) United States Patent
Lu et al.

(10) Patent No.: US 8,350,859 B2
(45) Date of Patent: Jan. 8, 2013

(54) METHOD AND APPARATUS FOR CHANGING LIP SHAPE AND OBTAINING LIP ANIMATION IN VOICE-DRIVEN ANIMATION

(75) Inventors: Yisha Lu, Shenzhen (CN); Jianyu Wang, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 0 days.

(21) Appl. No.: 13/117,244

(22) Filed: May 27, 2011

(65) Prior Publication Data

US 2011/0227931 A1    Sep. 22, 2011

Related U.S. Application Data

(63) Continuation of application No. PCT/CN2010/070026, filed on Jan. 5, 2010.

(30) Foreign Application Priority Data

Jan. 19, 2009    (CN) .......................... 2009 1 0003083

(51) Int. Cl.
*G06T 13/00*    (2011.01)

(52) U.S. Cl. ...................................... 345/473; 345/474

(58) Field of Classification Search .................. 345/473, 345/474
See application file for complete search history.

(56) References Cited

U.S. PATENT DOCUMENTS

| | | | | |
|---|---|---|---|---|
| 5,426,460 A | * | 6/1995 | Erving et al. | 348/14.02 |
| 5,657,426 A | * | 8/1997 | Waters et al. | 704/276 |
| 6,737,572 B1 | * | 5/2004 | Jameson et al. | 84/741 |

FOREIGN PATENT DOCUMENTS

| | | |
|---|---|---|
| CN | 1731833 A | 2/2006 |
| CN | 1936889 A | 3/2007 |
| CN | 101482976 A | 7/2009 |
| JP | 2006-162760 A | 6/2006 |

OTHER PUBLICATIONS

Machine translation of CN 1731833.*
International Search Report: mailed Mar. 11, 2010; Appln. PCT/CN2010/070026.

* cited by examiner

*Primary Examiner* — Kee M Tung
*Assistant Examiner* — Sing-Wai Wu
(74) *Attorney, Agent, or Firm* — Ladas & Parry LLP

(57) ABSTRACT

The present invention discloses a method and apparatus for changing lip shape and obtaining a lip animation in a voice-driven animation, and relate to computer technologies. The method for changing lip shape includes: obtaining audio signals and obtaining motion extent proportion of lip shape according to characteristics of the audio signals; obtaining an original lip shape model inputted by a user and generating a motion extent value of the lip shape according to the original lip shape model and the obtained motion extent proportion of the lip shape; generating a lip shape grid model set according to the obtained motion extent value of the lip shape and a preconfigured lip pronunciation model library. The method for changing lip shape in a voice-driven animation includes an obtaining module, a first generating module and a second generating module. The solutions provided by the present invention have a simple algorithm and low cost.

14 Claims, 4 Drawing Sheets

METHOD AND APPARATUS FOR CHANGING LIP SHAPE AND OBTAINING LIP ANIMATION IN VOICE-DRIVEN ANIMATION

FIELD OF THE INVENTION

The present invention relates to video-based animation technologies, and more particularly to a method and apparatus for changing lip shape and obtaining a lip animation in a voice-driven animation.

BACKGROUND OF THE INVENTION

Interactive Voice Response (IVR) is a product based on voice transmission. Most Internet users enjoy self-presentation and showing personality. In this way, it is needed to improve the IVR in both technologies and philosophy, e.g. make the voice have better expression, which can be implemented by video-based animation technologies. The video-based animation technologies take a mobile telephone or a web page as a platform, in which the voice is configured with a self-defined video-based animation, so as to give the voice with vivid expression.

In the video-based animation technologies, a technology for changing lip shape in a voice-driven animation is an important portion. In the prior art, a solution is provided, in which audio signals are mapped to the lip shape of facial animation parameters by using a Machine Learning mode. But, the algorithm of this solution is complex, and calculation cost is high.

SUMMARY OF THE INVENTION

Examples of the present invention provide a method and apparatus for changing lip shape and obtaining a lip animation in a voice-driven animation, so as to simplify the algorithm of changing the lip shape in a voice-driven animation and reduce the calculation cost.

The technical solutions are implemented as follows.

Examples of the present invention provide a method for changing lip shape in a voice-driven animation, including:

obtaining audio signals, and obtaining motion extent proportion of lip shape according to characteristics of the audio signals;

obtaining an original lip shape model inputted by a user, and generating a motion extent value of the lip shape according to the original lip shape model and the obtained motion extent proportion of the lip shape; and generating a lip shape grid model set according to the generated motion extent value of the lip shape and a preconfigured lip pronunciation model library.

Examples of the present invention also provide an apparatus for changing lip shape in a voice-driven animation, including:

an obtaining module, configured to obtain audio signals, and obtain motion extent proportion of lip shape according to characteristics of the audio signals;

a first generating module, configured to obtain an original lip shape model inputted by a user, and generate a motion extent value of the lip shape according to the original lip shape model and the obtained motion extent proportion of the lip shape; and a second generating model, configured to generate a lip shape grid model set according to the generated motion extent value of the lip shape and a preconfigured lip pronunciation model library.

In the examples of the present invention, by using the lip pronunciation model library, the lip shape is changed based on the voice; compared with the prior art, the technical solutions provided by the examples of the present invention have a simple algorithm and low cost.

Examples of the present invention also provide a method for obtaining a lip animation in a voice-driven animation, including:

obtaining audio signals, and obtaining motion extent proportion of lip shape according to characteristics of the audio signals;

obtaining an original lip shape model inputted by a user, and generating a motion extent value of the lip shape according to the original lip shape model and the obtained motion extent proportion of the lip shape;

generating a lip shape grid model set according to the generated motion extent value of the lip shape and a preconfigured lip pronunciation model library; and generating a lip animation according to the lip shape grid model set.

Examples of the present invention also provide an apparatus for obtaining a lip animation in a voice-driven animation, including:

an obtaining module, configured to obtain audio signals, and obtain motion extent proportion of lip shape according to characteristics of the audio signals;

a first generating module, configured, to obtain an original lip shape model inputted by a user, and generate a motion extent value of the lip shape according to the original lip shape model and the obtained motion extent proportion of the lip shape;

a second generating module, configured to generate a lip shape grid model set according to the generated motion extent value of the lip shape and a preconfigured lip pronunciation model library; and a third generating module, configure to generating a lip animation according to the lip shape grid model set.

In the examples of the present invention, by using the lip pronunciation model library, the lip shape is changed based on the voice; compared with the prior art, the technical solutions provided by the examples of the present invention have a simple algorithm and low cost.

BRIEF DESCRIPTION OF THE DRAWINGS

In order to make the technical solutions in the examples of the present invention or the technical solutions in the prior art clearer, the drawings used in the examples or used in the prior art will be described simply. Obviously, the drawings described below are only some examples of the present invention, and those skilled in the art can understand that other drawings may be obtained according to these drawings without creative labor.

DETAILED DESCRIPTION OF THE INVENTION

In order to make the purpose, solutions and merits clearer, the present invention will be illustrated in detail hereinafter with reference to the accompanying drawings. Obviously, the examples described below are only partial examples of the present invention, instead of all examples. Based on the examples of the present invention, other examples obtained by those skilled in the art without creative labor belong to the protection scope of the present invention.

Figure 1:
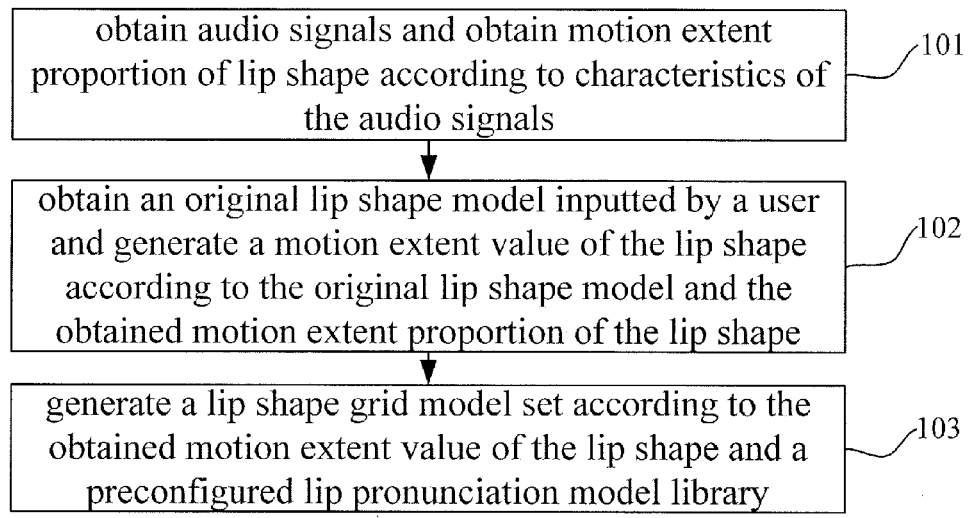
FIG. 1 is a flowchart illustrating a method for changing lip shape in a voice-driven animation in accordance with a first example of the present invention.
Figure 2:
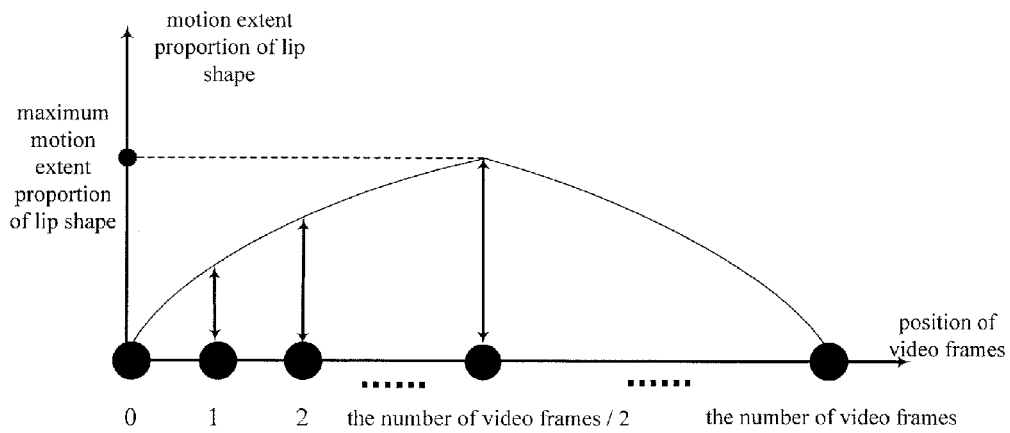
FIG. 2 is a flowchart illustrating the number of video frames and the motion extent proportion of lip shape in accordance with the first example of the present invention.

The first example of the present invention provides a method for changing lip shape based on voice. As shown in FIG. 1, the method includes the following steps.

Step 101, audio signals are obtained, and motion extent proportion of lip shape is obtained according to characteristics of the audio signals.

Specifically, the step of obtaining the motion extent proportion of the lip shape according to the characteristics of the audio signals includes the following steps.

Step 101A, the audio signals are traversed, and a maximum sample data value maxSampleValue of the audio signals is obtained.

Step 101B, the audio signals are divided into windows, each window is divided into groups, an average of sample data values in each group is obtained, an average group avgGroup of each window is obtained, where the average group avgGroup includes averages corresponding to groups in the window; a maximum value among the average group avgGroup of each window is obtained, and a maximum group windowPeak which comprises maximum values corresponding to all the windows is obtained.

A syllable is a basic voice unit. Specifically, in Chinese, each syllable corresponds to one kind of lip shape, and it takes 200 to 300 milliseconds to pronounce one syllable in a uniform pronunciation procedure. There may be a voice change in duration of pronouncing each syllable, so it is necessary to divide the syllable into phonemes. According to the above principle, the obtained audio signals are divided into windows with a certain length, and each window corresponds to one syllable; each window is further divided into groups with a certain length, and each group corresponds to one phoneme. Suppose it takes x seconds to pronounce the syllable and the length of the window is WindowLen, WindowLen=x*audio sampling rate; suppose it takes y seconds to pronounce the phoneme and the length of the group is GroupLen, GroupLen=y*audio sampling rate.

Specifically, the average of the sample data values in each group is equal to that the sum of all the sample data values in the group is divided by GroupLen, and the average is put into the average group avgGroup; a maximum value in the average group avgGroup is obtained and is put into a maximum group windowPeak.

Optionally, in order to avoid unnecessary motion of the lip shape and present necessary motion of the lip shape fluently, noise-suppressed processing is performed for the audio signals when the audio signals are obtained.

Step 101C, a maximum motion extent value of the lip shape corresponding to the current window is obtained according to the obtained maximum group windowPeak and the obtained maximum sample data value.

Specifically, an average of the sample data values of each group in a current window i (i>=0) is obtained; a maximum value windowPeak[i] among the averages corresponding to the groups in the current window i is obtained; a ratio scale[i] of the maximum windowPeak[i] and a maximum audio sample data value maxSampleValue is calculated. For each value scale[i] of a scale group, a maximum motion extent value extent[i] of the lip shape corresponding to the current window i is calculated, i.e. extent[i]=scale[i]*maxLen, where maxLen is the maximum motion extent value of the lip shape of all the windows.

Step 101D, motion extent proportion of the lip shape in each video frame corresponding to the current window is obtained according to the maximum motion extent value of the lip shape corresponding to the current window.

Specifically, the motion extent proportion scaleForFrame[k] of the lip shape in the $j^{th}$ video frame corresponding to the current window i is obtained, i.e. scaleForFrame[k]=j*(scale[i]/(frameNumber/2)), where k=frameNumber*i+j, 0=<k<the total number of video frames, frameNumber represents the number of video frames corresponding to each window, frameNumber=x*a video sampling rate, x represents duration of pronouncing each syllable. In the example of the present invention, the default video sampling rate is 30 frames per second, which may be modified by a user according to requirements; j is increased from 0 to frameNumber/2 and then is decreased from frameNumber/2 to 0, and j is an integer.

Step 102, an original lip shape model inputted by the user is obtained, and a motion extent value of the lip shape is generated according to the original lip shape model and the obtained motion extent proportion of the lip shape.

Specifically, the motion extent value of the lip shape includes: motion extent value of the lip shape in the vertical direction and motion extent value of the lip shape in the horizontal direction; the motion extent value in the horizontal direction is Length*scaleForFrame[k], and the motion extent value in the vertical direction is Width*scaleForFrame[k], where 0=<k<the total number of the video frames, and Length and Width are respectively the length and width of the original lip shape.

It should be noted that, the original lip shape model inputted by the user may change according to practical applications.

Step 103, a lip shape grid model set is generated according to the obtained motion extent value of the lip shape and a preconfigured lip pronunciation model library.

Figure 3:
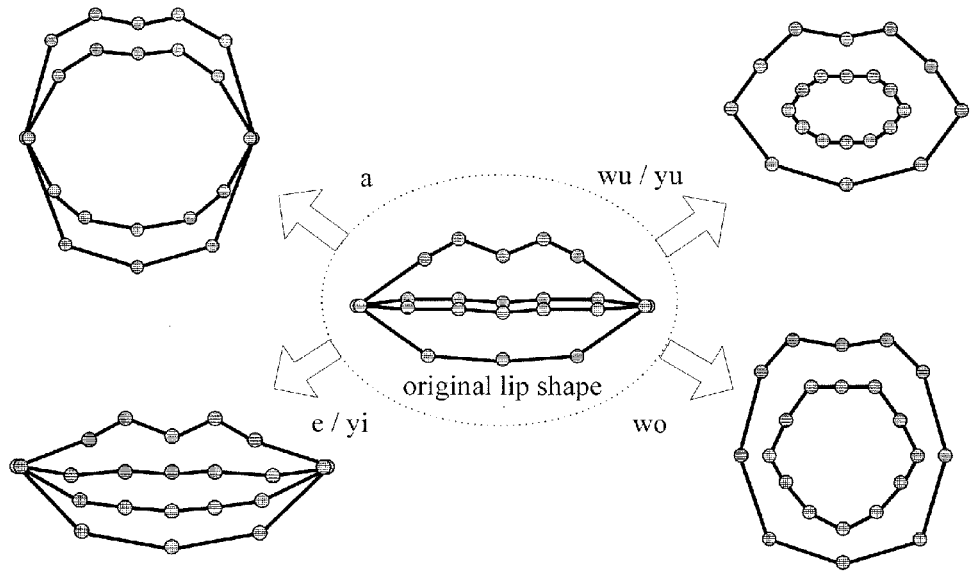
FIG. 3 is a schematic diagram illustrating a lip pronunciation model library in accordance with the first example of the present invention.

In this step, the lip pronunciation model library is established based on pronunciation characteristics of Chinese. In Chinese, a word consists of an initial consonant and a vowel, and the lip shape mainly relates to the pronunciation of the vowel. Vowels include single-vowels, complex-vowels and nasal-vowels. The single-vowel consists of one vowel, and the lip shape keeps unchanged during the pronunciation; the complex-vowel consists of two or three vowels, and both the pronunciation and the lip shape changes gradually; the pronunciation of the nasal-vowel does not change the lip shape a lot. Therefore, the pronunciation models established for the lip shape are mainly based on the pronunciation characteristics of the single-vowels. The pronunciation of the single-vowels includes "a, wo, e, yi, wu, yu", which represent six Chinese characters with the same pronunciation as the single-vowels. The lip shape corresponding to "wu" and "yu" is similar, and thus the two kinds of lip shape are combined into one kind of lip shape; the lip shape corresponding to "e" and "yi" is similar, and thus the two kind of lip shape are combined into one kind of lip shape; finally, a lip pronunciation model library including four types of lip pronunciation models is used to express the lip shape of the single-vowels, as shown in FIG. 3. The lip pronunciation model library must include: one original lip model and various lip pronunciation models established according to the above principle and based on the original lip model. It should be noted that, the lip pronunciation model library is not limited to include only the above four lip pronunciation models of the single-vowels. The lip pronunciation models in the lip pronunciation model library may change according to pronunciation characteristics of different languages. For example, according to the pronunciation characteristics of English, the lip pronunciation models corresponding to vowels "a, e, i, o and u" of English are included in the lip pronunciation model library.

Specifically, the step of generating the lip shape grid model set according to the motion extent value of the lip shape and the preconfigured lip pronunciation model library includes the following steps.

Step 103A, one lip pronunciation model is randomly selected from the preconfigured lip pronunciation model library, and is taken as an original pronunciation model of the current lip shape.

Step 103B, vertexes of the original pronunciation model and the original lip model in the lip pronunciation model library are obtained, an offset proportion of each vertex of the original pronunciation model is calculated. Specifically, the offset between the vertex z of the original pronunciation model and the vertex z of the original lip model in the lip pronunciation model library is x_hor in the horizontal direction and is y_ver in the vertical direction, then the offset proportion of the vertex z in the horizontal direction is x_hor/modelLength, and the offset proportion of the vertex z in the vertical direction is y_ver/modelWidth, where modelLength and modelWidth are respectively the length and width of the original lip model in the lip pronunciation model library, 0=<z<the number of the vertexes of the original pronunciation model.

Step 103C, the vertex offsets of the current video frame is obtained by multiplying the offset proportion of each vertex of the original pronunciation model by the motion extent value of the lip shape of the current video frame corresponding to the vertex.

Step 103D, a lip shape model of the current video frame is obtained by superposing the original lip shape model inputted by the user respectively with the vertex offsets of the current video frame.

Step 103E, the lip shape models of all video frames are arranged according to the audio sequence, and the lip shape grid model set is generated.

In the examples of the present invention, by using the lip pronunciation model library, the lip shape is changed based on the voice; compared with the prior art, the technical solutions provided by the examples of the present invention have a simple algorithm and low cost.

Figure 4:
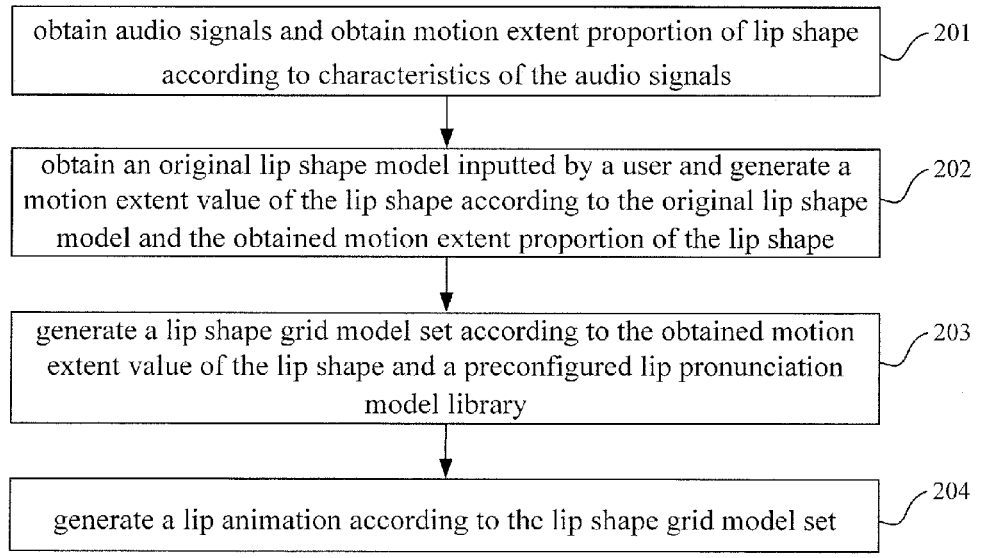
FIG. 4 is a flowchart illustrating a method for obtaining a lip animation in a voice-driven animation in accordance with a second example of the present invention.

The second example provides a method for obtaining a lip animation. As shown in FIG. 4, the method includes the following steps.

Step 201, audio signals are obtained, and motion extent proportion of lip shape is obtained according to characteristics of the audio signals.

Step 201 is the same as the step 101 and will not be described herein.

Step 202, an original lip shape model inputted by a user is obtained, and a motion extent value of the lip shape is generated according to the original lip shape model and the obtained motion extent proportion of the lip shape.

Step 202 is the same as the step 102 and will not be described herein.

Step 203, a lip shape grid model set is generated according to the obtained motion extent value of the lip shape and a preconfigured lip pronunciation model library.

Step 203 is the same as the step 103 and will not be described herein.

Step 204, a lip animation is generated according to the lip shape grid model set.

Specifically, the lip animation may be generated by using a common interpolation technology according to the lip shape grid model set and the original lip shape model.

In the examples of the present invention, by using a lip pronunciation model library, the lip shape is changed based on the voice; compared with the prior art, the technical solutions provided by the examples of the present invention have a simple algorithm and low cost.

Figure 5:
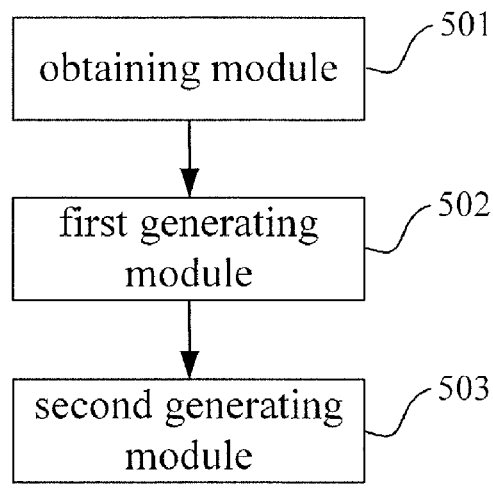
FIG. 5 is a schematic diagram illustrating an apparatus for changing lip shape in a voice-driven animation in accordance with a third example of the present invention.

The third example of the present invention provides an apparatus for changing lip shape in a voice-driven animation. As shown in FIG. 5, the apparatus includes:

an obtaining module 501, configured to obtain audio signals, and obtain motion extent proportion of lip shape according to characteristics of the audio signals;

a first generating module 502, configured to obtain an original lip shape model inputted by a user, and generate a motion extent value of the lip shape according to the original lip shape model and the obtained motion extent proportion of the lip shape; and a second generating module 503, configured to generate a lip shape grid model set according to the generated motion extent value of the lip shape and a preconfigured lip pronunciation model library.

Figure 6:
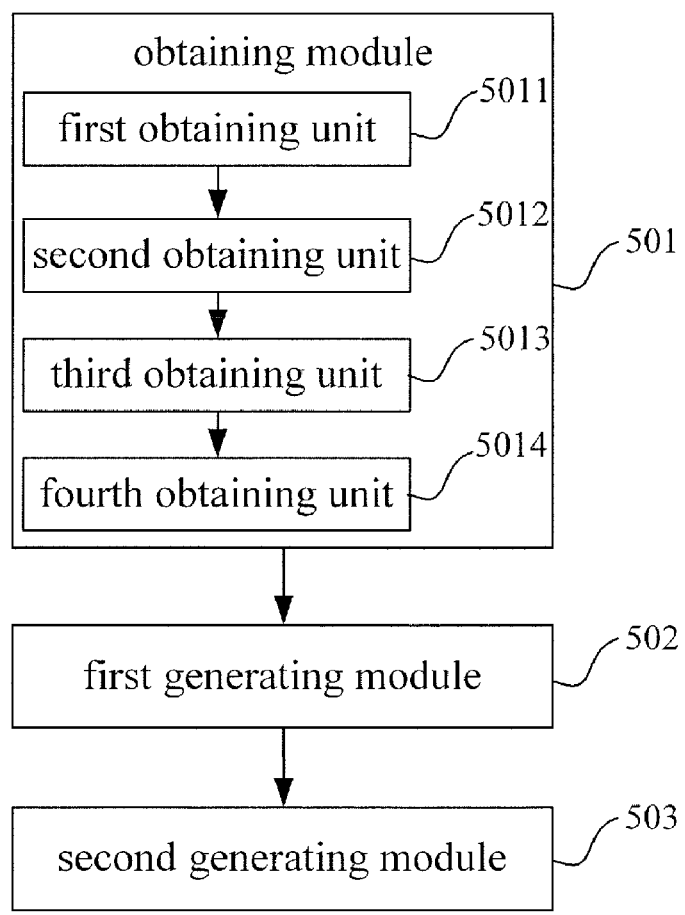
FIG. 6 is a schematic diagram illustrating another apparatus for changing lip shape in a voice-driven animation in accordance with the third example of the present invention.

Further, as shown in FIG. 6, the obtaining module 501 comprises:

a first obtaining unit 5011, configured to traverse the audio signals, and obtain a maximum sample data value;

a second obtaining unit 5012, configured to divide the audio signals into windows, divide each window into groups, obtain an average of sample data values in each group, obtain an average group avgGroup of each window, where the average group avgGroup comprises averages corresponding to groups in the window; obtain a maximum value among the average group avgGroup of each window, and obtain a maximum group windowPeak which includes maximum values corresponding to all the windows;

a third obtaining unit 5013, configured to obtain a maximum motion extent value of the lip shape corresponding to a current window i according to the obtained maximum group windowPeak and the obtained maximum sample data value; and a fourth obtaining unit 5014, configured to obtain the motion extent proportion of the lip shape in a current video frame corresponding to the current window i according to the maximum motion extent value of the lip shape corresponding to the current window i.

Further, the second obtaining unit 5012 includes:

a fifth obtaining unit, configured to obtain an average of the sample data values of each group in the current window i;

a sixth obtaining unit, configured to obtain a maximum windowPeak[i] among the averages corresponding to the groups in the current window i;

a seventh obtaining unit, configured to calculate a ratio scale[i] of the maximum windowPeak[i] and a maximum audio sample data value maxSampleValue;

an eighth obtaining unit, configured to calculate the maximum motion extent value extent[i] of the lip shape corresponding to the current window i, where extent[i]=scale[i]*maxLen;

where i>=0, maxLen is the maximum motion extent value of the lip shape of all windows.

Further, the fourth obtaining unit 5014 is specifically configured to obtain a motion extent proportion scaleForFrame [k] of the lip shape in the $j^{th}$ video frame corresponding to the current window i, i.e. scaleForFrame[k]=j*(scale[i]/(frameNumber/2)), where k=frameNumber*i+j, 0=<k<the total number of video frames, frameNumber represents the number of video frames corresponding to each window, frameNumber=x*video sampling rate, x represents duration of pronouncing each syllable; j is increased from 0 to frameNumber/2 and then decreased from frameNumber/2 to 0, and j is an integer.

Further, the first generating module 502 generating the motion extent value of the lip shape according to the original lip shape model and the obtained motion extent proportion of the lip shape includes that:

the first generating module 502 is configured to calculate the motion extent value Length*scaleForFrame[k] in the horizontal direction, and calculate the motion extent value Width*scaleForFrame[k] in the vertical direction, where 0=<k<the total number of video frames, and Length and Width are respectively the length and width of the original lip shape.

Figure 7:
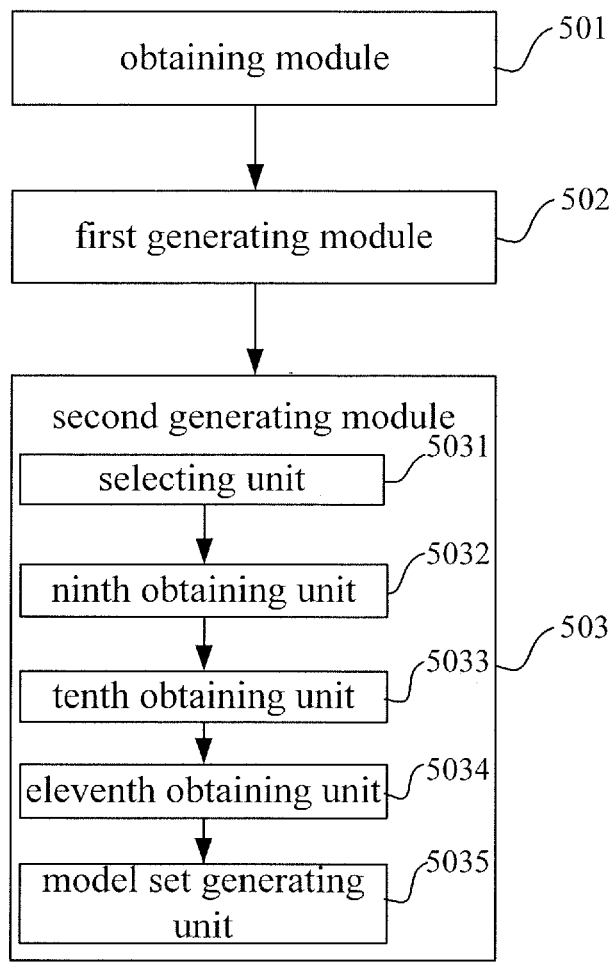
FIG. 7 is a schematic diagram illustrating another apparatus for changing lip shape in a voice-driven animation in accordance with the third example of the present invention.

Further, as shown in FIG. 7, the second generating module 503 includes:

a selecting unit 5031, configured to randomly select one lip pronunciation model from the preconfigured lip pronunciation model library, and take the lip pronunciation model as an original pronunciation model of current lip shape;

a ninth obtaining unit 5032, configured to obtain vertexes of the original pronunciation model and an original lip model in the lip pronunciation model library, and calculate an offset proportion of each vertex of the original pronunciation model;

a tenth obtaining unit 5033, configured to obtain vertex offsets of the current video frame by multiplying the offset proportion of each vertex of the original pronunciation model by the motion extent value of the lip shape of the current video frame corresponding to the vertex;

an eleventh obtaining unit 5034, configured to obtain the lip shape model of the current video frame by superposing the obtained original lip shape model inputted by the user respectively with the vertex offsets of the current video frame;

a model set generating unit 5035, configured to arrange lip shape models of all video frames, and generate the lip shape grid model set.

Further, the ninth obtaining unit 5032 calculating the offset proportion of each vertex of the original pronunciation model includes that:

the ninth obtaining unit 5032 is configured to calculate an offset proportion x_hor/modelLength of an vertex z of the original pronunciation model in the horizontal direction, and calculate an offset proportion y_ver/modelWidth of the vertex z in the vertical direction, where modelLength and modelWidth are respectively the length and width of the original lip model in the lip pronunciation model library, and 0=<z<the number of the vertexes of the original pronunciation model.

Further, the obtaining module 501 is further configured to perform noise-suppressed processing for the audio signals.

It should be noted that, the detail process of obtaining the audio signals and obtaining the motion extent proportion of the lip shape according to the characteristics of the audio signals by the obtaining module 501 may refer to the step 101 in the first example.

It should be noted that, the detail process of obtaining the original lip shape model inputted by the user and generating the motion extent value of the lip shape according to the original lip shape model and the obtained motion extent proportion of the lip shape by the first generating module 502 may refer to the step 102 in the first example.

It should be noted that, the detail process of generating the lip shape grid model set according to the obtained motion extent value of the lip shape and the preconfigured lip pronunciation model library by the second generating module 503 may refer to the step 103 in the first example.

In the examples of the present invention, by using the lip pronunciation model library, the lip shape is changed based on the voice; compared with the prior art, the technical solutions provided by the examples of the present invention have a simple algorithm low cost.

Figure 8:
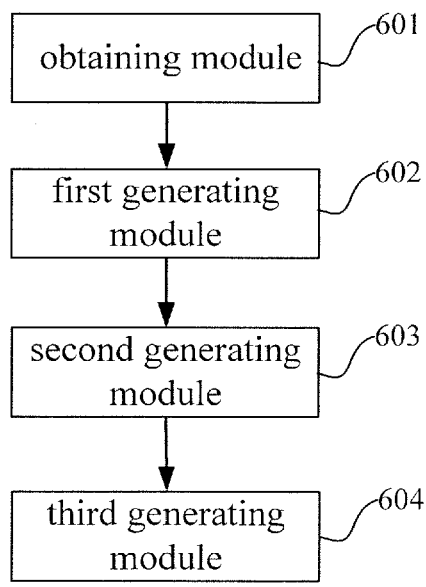
FIG. 8 is a schematic diagram illustrating an apparatus for obtaining a lip animation in accordance with a fourth example of the present invention.

A fourth example of the present invention provides an apparatus for obtaining a lip animation. As shown in FIG. 8, the apparatus includes:

an obtaining module 601, configured to obtain audio signals, and obtain motion extent proportion of lip shape according to characteristics of the audio signals;

a first generating module 602, configured to obtain an original lip shape model inputted by a user, and generate a motion extent value of the lip shape according to the original lip shape model and the obtained motion extent proportion of the lip shape;

a second generating module 603, configured to generate a lip shape grid model set according to the generated motion extent value of the lip shape and a preconfigured lip pronunciation model library; and a third generating module 604, configured to generate a lip animation according to the lip shape grid model set.

The obtaining module 601, the first generating module 602 and the second generating module 603 are respectively equivalent to the obtaining module, the first generating module and the second generating module in the third example, and will not be described herein.

It should be noted that, the detail process of obtaining the audio signals and obtaining the motion extent proportion of the lip shape according to characteristics of the audio signals by the obtaining module 601 may refer to the step 101 in the first example.

It should be noted that, the detail process of obtaining the original lip shape model inputted by the user and generating the motion extent value of the lip shape according to the original lip shape model and the obtained motion extent proportion of the lip shape by the first generating module 602 may refer to the step 102 in the first example.

It should be noted that, the detail process of generating the lip shape grid model set according to the obtained motion extent value of the lip shape and the preconfigured lip pronunciation model library by the second generating module 603 may refer to the step 103 in the first example.

In the examples of the present invention, by using the lip pronunciation model library, the lip shape is changed based on the voice; compared with the prior art, the technical solutions provided by the examples of the present invention have a simple algorithm low cost.

The technical solutions of the above four examples may be applied to, but not limited to, a terminal video based animation or a web page video based animation for entertainment, may be applicable not only to Chinese, but also to English, French or other languages. In order to be convenient for description, Chinese is taken as an example in the above four examples, and the processing of other languages is similar and will not be described herein. The original lip shape model inputted by the user may be obtained according to human faces, animal faces and cartoon images etc; the audio signals are also defined by the user, e.g. audio signals of normal talks or singing, or specially processed audio signals.

Those skilled in the art should understand that all or parts of steps in the above method examples may be implement by using hardware instructed by a program, the program may be stored in a computer-read storage medium, and the storage medium includes a floppy disk, a hard disk or a CD.

The foregoing are only preferred examples of the present invention and are not for use in limiting the protection scope of the present invention. Any modification, equivalent replacement and improvement made within the scope of the present invention should be covered under the protection scope of the present invention.

The invention claimed is:

1. A method for changing lip shape in a voice-driven animation, comprising:
   obtaining audio signals, and obtaining motion extent proportion of lip shape according to characteristics of the audio signals;
   obtaining an original lip shape model inputted by a user, and generating a motion extent value of the lip shape according to the original lip shape model and the obtained motion extent proportion of the lip shape; and
   generating a lip shape grid model set according to the generated motion extent value of the lip shape and a preconfigured lip pronunciation model library; wherein
   the obtaining motion extent proportion of lip shape according to characteristics of the audio signals comprises:
   traversing the audio signals, and obtaining a maximum sample data value of the audio signals;
   dividing the audio signals into windows, dividing each window into groups, obtaining an average of sample data values in each group, obtaining an average group avgGroup of each window, wherein the average group avgGroup comprises averages corresponding to groups in the window; obtaining a maximum value among the average group avgGroup of each window, and obtaining a maximum group windowPeak which comprises maximum values corresponding to all the windows;
   obtaining a maximum motion extent value of the lip shape corresponding to a current window i according to the obtained maximum group windowPeak and the obtained maximum sample data value; and
   obtaining the motion extent proportion of the lip shape in a current video frame corresponding to the current window i according to the maximum motion extent value of the lip shape corresponding to the current window i, wherein i>=0.

2. The method of claim 1, wherein
   obtaining a maximum motion extent value of the lip shape corresponding to a current window i according to the obtained maximum group windowPeak and the obtained maximum sample data value comprises:
   obtaining an average of sample data values of each group in the current window i;
   obtaining a maximum value windowPeak[i] among the averages corresponding to the groups in the current window i;
   calculating a ratio scale[i] of the maximum value windowPeak[i] and a maximum audio sample data value maxSampleValue;
   calculating the maximum motion extent value extent[i] of the lip shape corresponding to the current window i, wherein extent[i]=scale[i]*maxLen;
   wherein maxLen is the maximum motion extent value of the lip shape of all the windows.

3. The method of claim 1, wherein
   obtaining the motion extent proportion of the lip shape in a current video frame corresponding to the current window i according to the maximum motion extent value of the lip shape corresponding to the current window i comprises:
   obtaining a motion extent proportion scaleForFrame[k] of the lip shape in the jth video frame corresponding to the current window i, wherein scaleForFrame[k]=j*(scale[i]/(frameNumber/2));
   wherein k=frameNumber*i+j, 0=<k<the total number of video frames, frameNumber represents the number of video frames corresponding to each window, frameNumber=x*a video sampling rate, x represents duration of pronouncing each syllable, j is increased from 0 to frameNumber/2 and then is decreased from frameNumber/2 to 0, and j is an integer.

4. The method of claim 3, wherein
   generating a motion extent value of the lip shape according to the original lip shape model and the obtained motion extent proportion of the lip shape comprises:
   calculating the motion extent value Length*scaleForFrame[k] in a horizontal direction, and calculating the motion extent value Width*scaleForFrame[k] in a vertical direction, wherein Length and Width are respectively the length and width of the original lip shape model.

5. The method of claim 1, wherein generating a lip shape grid model set according to the generated motion extent value of the lip shape and a preconfigured lip pronunciation model library comprises:
   randomly selecting one lip pronunciation model from the preconfigured lip pronunciation model library, and taking the lip pronunciation model as an original pronunciation model of a current lip shape;
   obtaining vertexes of the original pronunciation model and an original lip model in the lip pronunciation model library, and calculating an offset proportion of each vertex of the original pronunciation model;
   obtaining vertex offsets of the current video frame by multiplying the offset proportion of each vertex of the original pronunciation model by the lip shape motion extent value of the current video frame corresponding to the vertex;
   obtaining the lip shape model of the current video frame by superposing the obtained original lip shape model inputted by the user respectively with the vertex offsets of the current video frame;
   arranging lip shape models of all video frames, and generating the lip shape grid model set.

6. The method of claim 5, wherein calculating an offset proportion of each vertex of the original pronunciation model comprises:
   calculating an offset proportion x_hor/modelLength of an vertex z of the original pronunciation model in the horizontal direction, and calculating an offset proportion y_ver/modelWidth of the vertex z in the vertical direction;

wherein modelLength and modelWidth are respectively the length and width of the original lip model in the lip pronunciation model library, x_hor and y_ver are respectively an offset between the vertex z of the original pronunciation model and the vertex z of the original lip model in the lip pronunciation model library in the horizontal direction and an offset between the vertex z of the original pronunciation model and the vertex z of the original lip model in the lip pronunciation model library in the vertical direction, and 0=<z<the number of the vertexes of the original pronunciation module.

7. The method of claim 5, further comprising: performing noise-suppressed processing for the audio signals.

8. The method of claim 1, wherein generating a lip shape grid model set according to the generated motion extent value of the lip shape and a preconfigured lip pronunciation model library comprises:
  randomly selecting one lip pronunciation model from the preconfigured lip pronunciation model library, and taking the lip pronunciation model as an original pronunciation model of a current lip shape;
  obtaining vertexes of the original pronunciation model and an original lip model in the lip pronunciation model library, and calculating an offset proportion of each vertex of the original pronunciation model;
  obtaining vertex offsets of the current video frame by multiplying the offset proportion of each vertex of the original pronunciation model by the lip shape motion extent value of the current video frame corresponding to the vertex;
  obtaining the lip shape model of the current video frame by superposing the obtained original lip shape model inputted by the user respectively with the vertex offsets of the current video frame;
  arranging lip shape models of all video frames, and generating the lip shape grid model set.

9. A method for obtaining a lip animation, comprising:
  obtaining audio signals, and obtaining motion extent proportion of lip shape according to characteristics of the audio signals;
  obtaining an original lip shape model inputted by a user, and generating a motion extent value of the lip shape according to the original lip shape model and the obtained motion extent proportion of the lip shape;
  generating a lip shape grid model set according to the generated motion extent value of the lip shape and a preconfigured lip pronunciation model library; and
  generating a lip animation according to the lip shape grid model set; wherein
  the obtaining motion extent proportion of lip shape according to characteristics of the audio signals comprises:
  traversing the audio signals, and obtaining a maximum sample data value of the audio signals;
  dividing the audio signals into windows, dividing each window into groups, obtaining an average of sample data values in each group, obtaining an average group avgGroup of each window, wherein the average group avgGroup comprises averages corresponding to groups in the window; obtaining a maximum value among the average group avgGroup of each window, and obtaining a maximum group windowPeak which comprises maximum values corresponding to all the windows;
  obtaining a maximum motion extent value of the lip shape corresponding to a current window i according to the obtained maximum group windowPeak and the obtained maximum sample data value; and
  obtaining the motion extent proportion of the lip shape in a current video frame corresponding to the current window i according to the maximum motion extent value of the lip shape corresponding to the current window i, wherein i>=0.

10. The method of claim 9, wherein
the obtaining a maximum motion extent value of the lip shape corresponding to a current window i according to the obtained maximum group windowPeak and the obtained maximum sample data value comprises:
  obtaining an average of sample data values of each group in the current window i;
  obtaining a maximum value windowPeak[i] among the averages corresponding to the groups in the current window i;
  calculating a ratio scale[i] of the maximum value windowPeak[i] and a maximum audio sample data value maxSampleValue;
  calculating the maximum motion extent value extent[i] of the lip shape corresponding to the current window i, wherein extent[i]=scale[i]*maxLen;
  wherein maxLen is the maximum motion extent value of the lip shape of all the windows.

11. The method of claim 9, wherein
obtaining the motion extent proportion of the lip shape in a current video frame corresponding to the current window i according to the maximum motion extent value of the lip shape corresponding to the current window i comprises:
  obtaining a motion extent proportion scaleForFrame[k] of the lip shape in the jth video frame corresponding to the current window i, wherein scaleForFrame[k]=j*(scale[i]/(frameNumber/2));
  wherein k=frameNumber*i+j, 0=<k<the total number of video frames, frameNumber represents the number of video frames corresponding to each window, frameNumber=x*a video sampling rate, x represents duration of pronouncing each syllable, j is increased from 0 to frameNumber/2 and then is decreased from frameNumber/2 to 0, and j is an integer.

12. The method of claim 11, wherein
the generating a motion extent value of the lip shape according to the original lip shape model and the obtained motion extent proportion of the lip shape comprises:
  calculating the motion extent value Length*scaleForFrame[k] in a horizontal direction, and calculating the motion extent value Width*scaleForFrame[k] in a vertical direction, wherein Length and Width are respectively the length and width of the original lip shape model.

13. The method of claim 9, wherein the generating a lip shape grid model set according to the generated motion extent value of the lip shape and a preconfigured lip pronunciation model library comprises:
  randomly selecting one lip pronunciation model from the preconfigured lip pronunciation model library, and taking the lip pronunciation model as an original pronunciation model of a current lip shape;
  obtaining vertexes of the original pronunciation model and an original lip model in the lip pronunciation model library, and calculating an offset proportion of each vertex of the original pronunciation model;
  obtaining vertex offsets of the current video frame by multiplying the offset proportion of each vertex of the original pronunciation model by the lip shape motion extent value of the current video frame corresponding to the vertex;

obtaining the lip shape model of the current video frame by superposing the obtained original lip shape model inputted by the user respectively with the vertex offsets of the current video frame;

arranging lip shape models of all video frames, and generating the lip shape grid model set.

14. The method of claim 13, wherein the calculating an offset proportion of each vertex of the original pronunciation model comprises:

calculating an offset proportion x_hor/modelLength of an vertex z of the original pronunciation model in the horizontal direction, and calculating an offset proportion y_ver/modelWidth of the vertex z in the vertical direction;

wherein modelLength and modelWidth are respectively the length and width of the original lip model in the lip pronunciation model library, x_hor and y_ver are respectively an offset between the vertex z of the original pronunciation model and the vertex z of the original lip model in the lip pronunciation model library in the horizontal direction and an offset between the vertex z of the original pronunciation model and the vertex z of the original lip model in the lip pronunciation model library in the vertical direction, and $0=<z<$the number of the vertexes of the original pronunciation module.

* * * * *